United States Patent Office 2,777,576
Patented Jan. 15, 1957

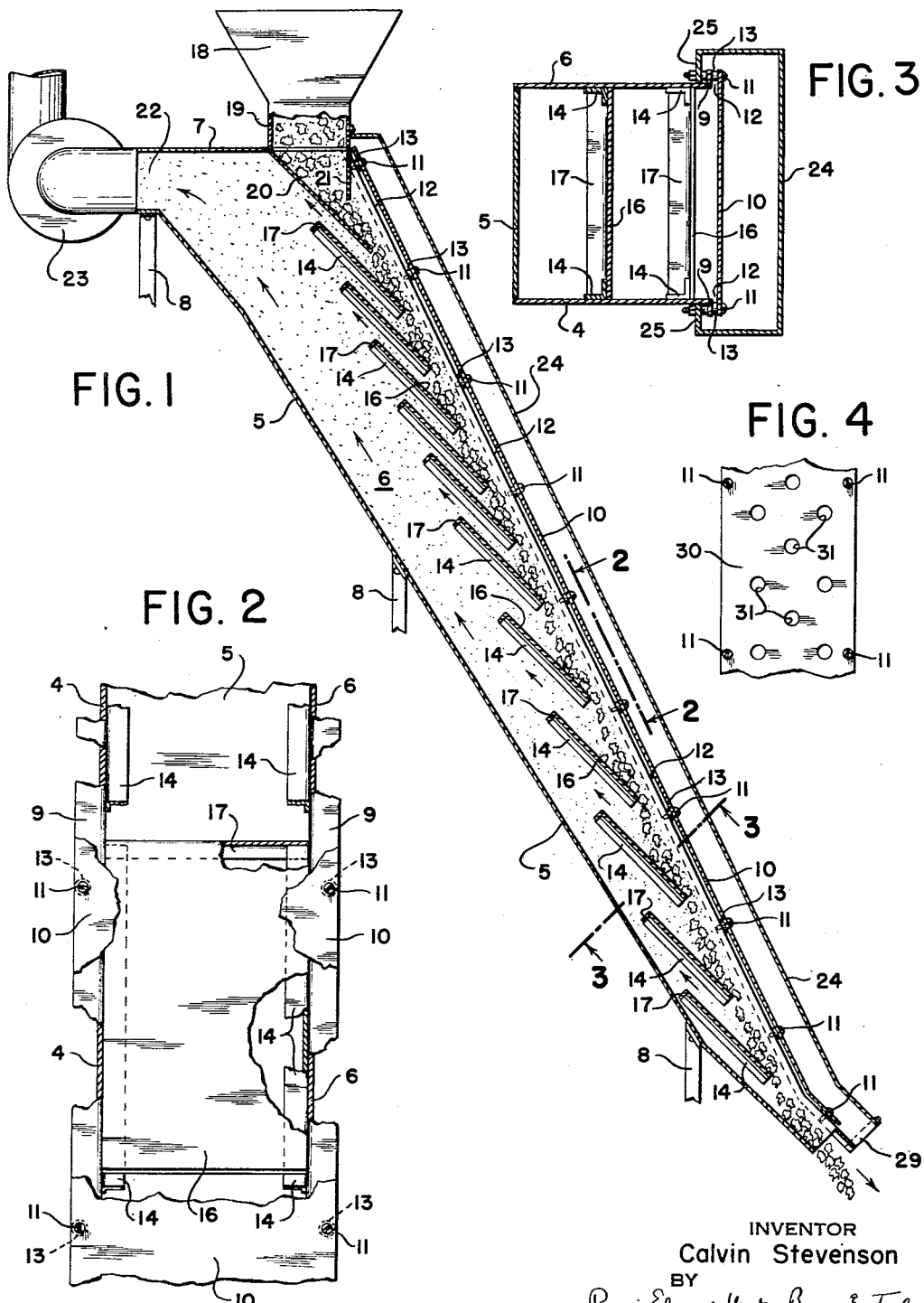

2,777,576

SEPARATING APPARATUS

Calvin Stevenson, Anaconda, Mont.

Application March 5, 1954, Serial No. 414,458

3 Claims. (Cl. 209—136)

This invention relates to apparatus for effecting the separation of fine particles from a mass of relatively coarsely divided material. More particularly, this invention provides an improved apparatus adapted to remove fine particles of dust from relatively coarsely divided solid material by a current of air or other gas.

Various types of apparatus are presently used to effect the separation of fine particles from larger-sized particles of bulk solid materials. This dedusting operation is required after the manufacture of various chemicals and materials in order to eliminate the dust hazard during the packaging of these materials, as well as to make the product more acceptable by the consumer who ultimately purchases such materials.

The apparatus of this invention comprises a stationary separator not employing moving parts which is capable of rapidly and efficiently separating fine particles from the initial mass of mixed coarse and fine material. The new apparatus comprises a vertically inclined chute having an open front and closed sides and back. A cover plate is secured to the chute so as to overlie its open front. A series of vertically spaced step baffle plates are mounted in the chute and each of the baffle plates is vertically inclined and has its uppermost edge spaced a greater distance from the cover plate than its lower edge. Each of the baffle plates is mounted in the chute to extend transversely thereacross between the sides thereof, and is spaced from the cover and from the back of the chute to provide two continuous and direct passageways from the top to the bottom of the chute. Gas passageways leading into the chute are provided along the length of the cover plate. Means are provided for introducing material from which fines are to be separated into the upper end of the continuous passageway between the baffle plates and the cover, whereby such material flows to the bottom of the chute over the inclined baffle plates. Means also are provided for causing a current of gas to flow through said gas passageways and through the material flowing over the baffle plates into the passageway between the baffle plates and the back of the chute, whereby fine particles in said material are separated and are collected in the current of gas.

While gas passageways leading into the chute along the length of the cover plate may be provided in various ways, I have found that when the cover plate is laterally spaced from the sides of the chute, such spacing provides very satisfactory gas passageways.

In many operations it is desirable to employ air as the gas. However, when employing other gases or when it is desirable to pass a heated gas through the material flowing down over the baffle plates, it is necessary that such gases be directly guided into the chute. For such purposes I provide a hood secured to the chute and overlying the cover and the gas passageways. The desired gas is fed directly into the hood.

A preferred embodiment of the invention is described below with reference to the accompanying drawings, in which Fig. 1 is a sectional elevation of the apparatus;

Fig. 2 is a fragmentary view partially in section taken substantially along the line 2—2 in Fig. 1;

Fig. 3 is a view taken substantially along the line 3—3 in Fig. 1, and

Fig. 4 is a fragmentary front view of an alternative cover plate which may be secured to the chute.

Referring to Figs. 1 and 3 the apparatus comprises side plates 4 and 6, a back plate 5, and a top plate 7 welded or otherwise securely joined together to form a vertically inclined chute. Supporting members 8 secured to the back plate 5 form a conventional framework to support the chute. A flange 9 is provided along the edge of each of the side plates 4 and 6 at the open front of the chute, and a cover plate 10 is removably mounted on such flanges by a series of bolts 11. Washers 13 are provided on each bolt 11 between the flanges 9 and the cover plate 10 so that the cover plate 10 is spaced from the flanges 9 of the plates 4 and 6 to provide gas inlet passageways 12 therebetween.

A series of angle iron brackets 14 are welded or otherwise fixedly secured to the inner surfaces of the side plates 4 and 6 at vertically spaced intervals. A flat baffle plate 16 is supported on each oppositely disposed pair of brackets 14, so that it extends transversely across the chute between the sides thereof. The brackets 14 are vertically inclined so that the upper edges of the baffle plates 16 are spaced a greater distance from the cover plate 10 than are the lower edges thereof. A downwardly extending lip 17 is provided at the upper edge of each of the baffle plates 16, which lip engages the uppermost ends of its respective supporting brackets 14 to thereby hold each baffle plate 16 in position within the chute.

For purposes of illustration, a feed hopper 18 having a suitably conforming base 19 is welded or otherwise joined to the top plate 7 on the chute and is positioned over an opening through which the material to be treated is introduced into the chute. Guide plates 20 and 21 serve to guide the material on to the uppermost baffle plate 16. The distance separating the guide plates 20 and 21 determines the rate of flow of material into the chute and this distance may be varied depending on the nature of the material to be treated.

A gas and fines outlet 22 is provided at the upper end of the chute, and a power driven fan 23 is suitably arranged to exhaust gas and fines from the continuous passage between the baffle plates 16 and the back 5 of the chute. The lower end of the chute is open to allow for the discharge of treated material from which the fines have been separated.

A hood 24 having inwardly extending flanges 25 may be provided to overlie the cover plate 10. The hood 24 fits closely to the chute along the longitudinal extent thereof, and is further secured at its uppermost portion to the base 19 of the feed hopper 18. The lower end of the hood is open as indicated at 29, and may there be connected to a source of gas or heated air.

The manner of operating the above described apparatus is as follows: Material to be treated, such as crushed phosphate fertilizer to be dedusted, is fed into the hopper 18, from which it is guided by guide plates 20 and 21 on to the uppermost of the baffle plates 16. Thence it cascades downwardly over the series of baffle plates 16. Air or other gas is drawn into the hood 24 by the fan 23 through the opening indicated at 29, and flows into the chute through the gas passageways 12 between the cover plate 10 and the side plates 4 and 6. The air or gas then flows between the baffle plates 16, through the mass of material cascading down from one baffle plate to another. Gas laden with fine dust particles which it has picked up flowing through the mass of material then passes up and out of the chute through the opening indicated at 22.

The withdrawn gas containing fine dust particles preferably is treated further, as by a conventional filtering or condensing operation in a bag house or electrostatic precipitator to recover the fine particles. The relatively coarse material, after cascading down the series of baffle plates 16, is discharged through the open lower end of the chute. Such material is quite free of dust and is ready for packaging or shipment.

In normal operation of the apparatus the quantity of material discharging at the open lower end of the chute is kept great enough to prevent any substantial amount of air from being drawn into the system at this point. The air or gas introduced into the hood 24 is delivered directly between each successive pair of baffle plates 16 as fresh gas that is uncontaminated by previous contact with the mass of cascading solid material. This provides for rapid and efficient dedusting of the incoming solid material.

In treating phosphate fertilizer and in other operations in which the primary function of the apparatus is to remove dust or fine particles from the mass of material, and wherein air at room temperature is employed for this purpose, it is not necessary that the hood 24 be employed. However, when employing heated air or other special gas (e. g. a non-oxidizing or reducing gas) the use of the hood 24 provides for preventing contamination of these special gases by the atmosphere.

In any operation employing the hood 24, effective operation of the apparatus may be provided by eliminating the exhaust fan 23 and providing for the introduction of the air or gas into the hood 24 under pressure.

As shown in Fig. 4, an alternative cover plate 30 may be secured to the chute in place of the cover plate 10 shown in Fig. 1. The cover plate 30 is provided with a plurality of spaced openings 31 which serve as gas passageways through which the air or gas passes into the chute. When employing the cover plate 30 it need not be spaced from the chute side plates, although it may be desirable to so space it for some operations.

While the shape of the chute may be varied considerably, I have found it particularly desirable to construct it so that the continuous passageway for dust-laden gas, between the baffle plates 16 and the back plate 5, decreases progressively in cross-sectional area from top to bottom of the chute, as shown in Fig. 1. Thereby the dust-laden gas may flow upwardly to the outlet 22 without any substantial change in its velocity, which might tend to cause fine particles to settle therefrom, or to require excessive gas velocities through some portions of the apparatus, and especially through some portions of the downwardly cascading solid material, with the result that excessive dedusting or removal of fines might then occur.

The number, width, vertical spacing, and steepness of inclination of the baffle plates 16 in the chute is to a considerable extent determined by the amount of fine material to be removed and the amount of air or other gas which it will be necessary to employ to accomplish the desired degree of dedusting. The downward flow of the cascading material is more or less resisted by each baffle plate, and by increasing the number of baffle plates in the chute, a greater length of time of contact between the mass of material and the air or gas is established and a greater volume of fine particles may be removed.

The angle of inclination of each of the baffle plates is of course dependent on the flow characteristics of the material to be treated as well as on the amount of fines to be separated from the raw material. Those materials having free flowing characteristics do not require as sharp an angle of inclination for the baffle plates as materials which do not flow so readily.

The baffle plates 16 as shown in Fig. 1 are easily removable to permit occasional cleaning, and also to permit the number of plates in the chute to be varied in a single apparatus, thereby permitting the apparatus to be used for a variety of materials having different flow characteristics and different relative amounts of fines to be separated.

I have found the above-described apparatus to be particularly effective for dedusting phosphate fertilizers prior to packaging. It can be equally well used for similarly treating a wide variety of other materials. Its low maintenance cost (resulting from its lack of moving parts), its low power consumption, its low initial cost, and its rapid and efficient removal of fines from relatively coarse crushed solids make it a reliable, economical, and most effective apparatus for commercial dedusting operations.

I claim:

1. An apparatus for separating fine particles from a mass of material comprising a vertically inclined chute having an open front and closed sides and back, a cover plate overlying the open front of said chute but being spaced away from the sides thereof, a plurality of vertically spaced step baffle plates mounted in said chute, each of said baffle plates being vertically inclined and having its uppermost edge spaced a greater distance from said cover plate than its lower edge, each of the baffle plates mounted within said chute extending transversely thereacross between the sides thereof and being spaced from the cover and from the back thereof to provide two continuous and direct passageways from the top to the bottom of said chute, means for introducing material from which fines are to be separated into the upper end of the continuous passageway between the baffle plates and the cover, whereby said material flows to the bottom of the chute over the inclined baffle plates, and means for causing a current of air to flow through the space between said cover plate and the sides of the chute and through the material flowing over said baffle plates into the passageway between the baffle plates and the back of the chute, whereby fine particles in said material are separated therefrom and collected in said current of gas.

2. An apparatus for separating fine particles from a mass of material comprising a vertically inclined chute having an open front and closed sides and back, a cover plate overlying the open front of said chute but being spaced away from the sides thereof, a series of vertically spaced step baffle plates mounted in said chute, each of said baffle plates being vertically inclined and having its uppermost edge spaced a greater distance from said cover plate than its lower edge, each of the baffle plates mounted within said chute extending transversely thereacross between the sides thereof and being spaced from the cover and from the back thereof to provide two continuous and direct passageways from the top to the bottom of said chute, means for introducing material from which fines are to be separated into the upper end of the continuous passageway between the baffle plates and the cover, whereby said material flows to the bottom of the chute over the inclined baffle plates, a hood overlying said cover and said gas passageways, and means for causing a current of gas to enter said hood and to flow through the space between said cover plate and the sides of the chute and through the material flowing over said baffle plates into the passageway between the baffle plates and the back of the chute, whereby fine particles in said material are separated therefrom and collected in said current of gas.

3. An apparatus for separating fine particles from a mass of material comprising a vertically inclined chute having an open front and closed sides and back, a cover plate secured to said chute over said open front, a top extending between said sides and forward from said back and having an opening therein for introducing into said apparatus material from which fines are to be separated, a series of vertically spaced step baffle plates mounted in said chute, each of said baffle plates being vertically inclined and having its uppermost edge spaced a greater distance from said cover plate than its lower edge, each of the baffle plates mounted within said chute extending transversely thereacross between the sides thereof and being spaced from the cover and from the back thereof to provide two continuous and direct passageways from the top to the bottom of said chute, gas passageways leading into said chute along the length of said cover plate, a vertically inclined plate extending downwardly roughly parallel to said baffle plates from the rearward end of said opening in said top and a vertical plate extending downward to a point adjacent said vertically inclined plate from the forward end of said opening whereby a restriction is provided for controlling the rate of flow of material into said chute and a guide is provided for guiding material onto the uppermost of said baffle plates, a hood overlying said cover and means for causing a current of gas to enter said hood and flow through said gas passageways and through the material flowing over said baffle plates into the passageway between the baffle plates and the back of the chute, whereby fine particles in said material are separated therefrom and collected in said current of gas.

References Cited in the file of this patent
UNITED STATES PATENTS

| | | |
|---|---|---|
| 746,302 | Dodge | Dec. 8, 1903 |

FOREIGN PATENTS

| | | |
|---|---|---|
| 356,813 | Germany | July 28, 1922 |
| 471,273 | Canada | Feb. 6, 1951 |